Patented Apr. 21, 1931

1,801,709

UNITED STATES PATENT OFFICE

WERNER ZERWECK, OF FRANKFORT-ON-THE-MAIN-FECHENHEIM, AND RUDOLF MARIA HEIDENREICH, OF LEVERKUSEN, NEAR COLOGNE-ON-THE-RHINE, GERMANY, ASSIGNORS TO GENERAL ANILINE WORKS, INC., OF NEW YORK, N. Y., A CORPORATION OF DELAWARE

BROWN VAT DYESTUFFS OF THE ANTHANTHRONE SERIES AND PROCESS OF MAKING SAME

No Drawing. Application filed August 23, 1928, Serial No. 301,703, and in Germany August 30, 1927.

We have found that fast bright brown dyeing vat dye-stuffs are obtained by condensing a halogenated anthanthrone compound with an 1-amino-anthraquinone-2-aldehyde or with a derivative thereof. It is supposed that at first hydrogen halide is split off and the anthrimides thus formed undergo in the further course of reaction a ring closure while liberating water and yielding one or several acridine rings attached to the anthanthrone nucleus. According to this assumption the new dyestuffs produced by our process correspond probably to the general formula:

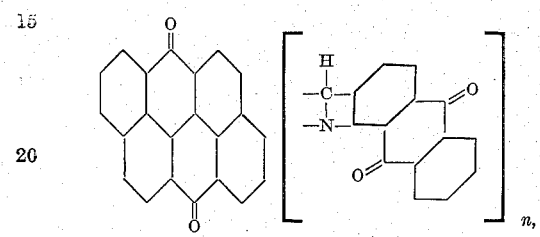

wherein the anthanthrone and the anthraquinone nucleus both may contain further substituents and $n$ means the number 1 or 2.

In order to further illustrate our invention the following examples are given, the parts being by weight and all temperatures in centigrade degrees; but we wish to be understood that our invention is not limited to the examples given nor to the exact conditions stated therein.

Example 1

A mixture of 3.85 parts of monobromo-anthanthrone, prepared according to Example 8 of the U. S. application Serial No. 145,697, of Herz and Zerweck, filed November 1, 1926, of 2.5 parts of 1-amino-anthraquinone-2-aldehyde, of 2 parts of anhydrous sodium acetate with addition of a small quantity of a catalyst as copper or a copper salt and 100 parts of nitro-benzene are heated to boiling for some hours while stirring. The precipitated reaction product is filtered off when cold, freed from salts and the adhering solvent in the usual manner and dried. The new dyestuff thus obtained corresponds probably to the formula:

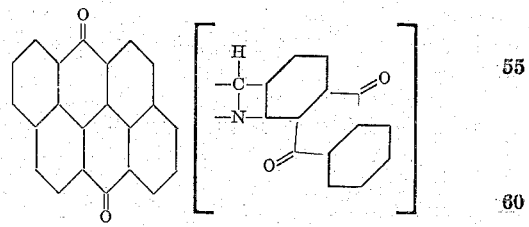

It represent a brown crystalline powder soluble in concentrated sulfuric acid with a red color, in hot nitrobenzene of trichloro-benzene with a brownish-yellow color and crystallizes from the latter solvents in brown radiate rods. Cotton is dyed from the reddish-violet hydrosulfite vat the same shade turning by soaping to a bright reddish yellow-brown of a very good fastness.

Example 2

4.6 parts of dibromo-anthanthrone, prepared according to Example 9 of the aforesaid U. S. application Serial No. 145,697, and 5 parts of 1-amino-anthraquinone-2-aldehyde, i. e. the dimolecular amount, are boiled for some hours with a reflux condenser in 200 parts of naphthalene with the addition of 4 parts of anhydrous sodium acetate and 0.5 parts of cuprous chloride. The mass is diluted with naphtha whilst hot, filtered off, washed with naphtha, then with spirit and finally extracted with hot dilute ammonia solution and dried. The new dyestuff thus obtained corresponds probably to the formula:

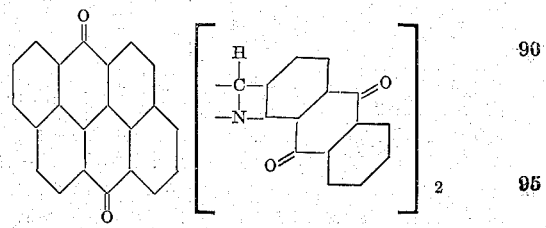

It represents a brown powder soluble in concentrated sulfuric acid with a red, in hot nitrobenzene with a brown color. It dyes cotton from a reddish-violet hydrosulfite vat fast red-brown shades.

*Example 3*

When in example 2 dibromo-anthanthrone is replaced by 3.75 parts of dichloro-anthanthrone, prepared as described in Example 2 of the aforesaid U. S. application Serial No. 145,697, the same dyestuff is obtained as explained in the foregoing example.

In the following claims the term "copper catalyst" is intended to comprise not only the metal itself but also copper compounds, particularly its salts.

We claim:

1. A process which comprises causing an 1-amino-anthraquinone-2-aldehyde to act upon a halogenated anthanthrone compound in the presence of a copper catalyst and of an acid-binding agent while heating.

2. A process which comprises causing an 1-amino-anthraquinone-2-aldehyde to act upon a halogenated anthanthrone compound in an organic diluent of high dissolving capacity and in the presence of a copper catalyst and of an acid-binding agent while heating.

3. A process which comprises causing a dimolecular amount of 1-amino-anthraquinone-2-aldehyde to act upon a monomolecular amount of dibromo-anthanthrone in an organic diluent of high dissolving capacity and in the presence of a copper catalyst and of an acid-binding agent while heating.

4. A process which comprises causing a dimolecular amount of 1-amino-anthraquinone-2-aldehyde to act upon a monomolecular amount of dibromo-anthanthrone in naphthalene as a diluent and in the presence of a small quantity of cuprous chloride and of anhydrous sodium acetate as an acid-binding agent while heating for some hours at a temperature of about the boiling point of naphthalene.

5. As new products vat dyestuffs of the anthanthrone series corresponding probably to the general formula:

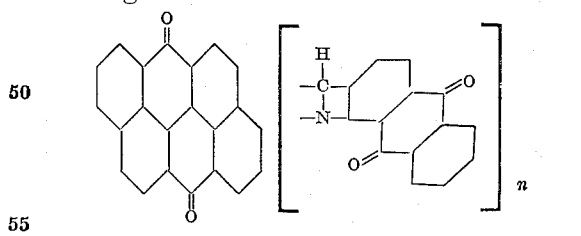

wherein $n$ means the number 1 or 2, which products represent brown powders soluble in concentrated sulfuric acid with a red color, dyeing cotton brown shades from a violettish vat, substantially identical with the products obtained by acting on a halogenated anthanthrone compound with an 1-amino-anthraquinone-2-aldehyde compound at an elevated temperature.

6. As a new product a vat dyestuff of the anthanthrone series corresponding probably to the formula:

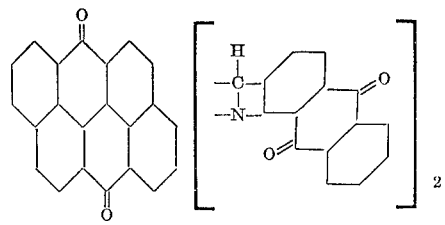

which product represents a brown powder soluble in concentrated sulfuric acid with a red, in hot nitrobenzene with a brown color, dyeing cotton from a reddish-violet hydrosulfite vat fast red-brown shades, substantially identical with the product obtained by acting on dibromo-anthanthrone with the dimolecular amount of 1-amino-anthraquinone-2-aldehyde at an elevated temperature.

In testimony whereof, we affix our signatures.

WERNER ZERWECK.
RUDOLF MARIA HEIDENREICH.